(12) United States Patent
March et al.

(10) Patent No.: US 6,655,223 B2
(45) Date of Patent: Dec. 2, 2003

(54) MODULAR MEASURING SYSTEM

(75) Inventors: Konrad March, Penzberg (DE); Ulrich Rettig, Wielenbach (DE); Raimund Essel, Weilheim (DE); Robert Hengel, Murnau (DE)

(73) Assignee: WTW Wissenschaftlich Technische Werkstaetten GmbH & Co. KG, Weilheim (DE)

( * ) Notice: Subject to any disclaimer, the term of this patent is extended or adjusted under 35 U.S.C. 154(b) by 0 days.

(21) Appl. No.: 09/964,782

(22) Filed: Sep. 26, 2001

(65) Prior Publication Data

US 2002/0139174 A1 Oct. 3, 2002

(30) Foreign Application Priority Data

Sep. 29, 2000 (DE) .......................................... 100 49 743

(51) Int. Cl.$^7$ ................................................ G12B 9/04
(52) U.S. Cl. ..................................................... 73/866.5
(58) Field of Search .......................... 73/866.1, 866.5, 73/431, 620, 31.05, 53.01; 324/115

(56) References Cited

U.S. PATENT DOCUMENTS

| | | | | |
|---|---|---|---|---|
| 3,054,024 A | * | 9/1962 | Dillen et al. | 361/747 |
| 4,423,465 A | * | 12/1983 | Teng-Ching et al. | 361/730 |
| 4,680,674 A | * | 7/1987 | Moore | 361/686 |
| 4,870,863 A | * | 10/1989 | Duncan et al. | 73/431 |
| 5,162,725 A | * | 11/1992 | Hodson et al. | 324/115 |
| 5,256,873 A | * | 10/1993 | Turner et al. | 250/239 |
| 5,353,009 A | * | 10/1994 | Marsh et al. | 340/505 |
| 5,568,356 A | * | 10/1996 | Schwartz | 361/679 |
| 5,821,405 A | * | 10/1998 | Dickey et al. | 73/53.01 |
| 6,008,985 A | * | 12/1999 | Lake et al. | 361/686 |
| 6,352,504 B1 | * | 3/2002 | Ise et al. | 600/300 |

* cited by examiner

Primary Examiner—Helen Kwok
Assistant Examiner—David A. Rogers
(74) Attorney, Agent, or Firm—Smith-Hill and Bedell

(57) ABSTRACT

The invention relates to a modular measuring system (10) comprising at least one measuring location having sensors, at least one connection module (18a, 18b, 18c), which is provided at the measuring location and which is preferably located in a housing (20) and is used to connect sensors, at least one communications port to connect sensors and at least one input/output unit (12), at least one element that is provided at the measuring location and that has an identification code for the input/output unit one electronic module that is provided in the input/output unit, that is controlled on the basis of the identification code, and that is used for the functions of the I/O elements (14, 16) of the input/output unit. Defining the functions of the input/output unit by means of the identification code provided at the measuring location largely prevents improper operation of the input/output unit.

15 Claims, 3 Drawing Sheets

Figure 1:
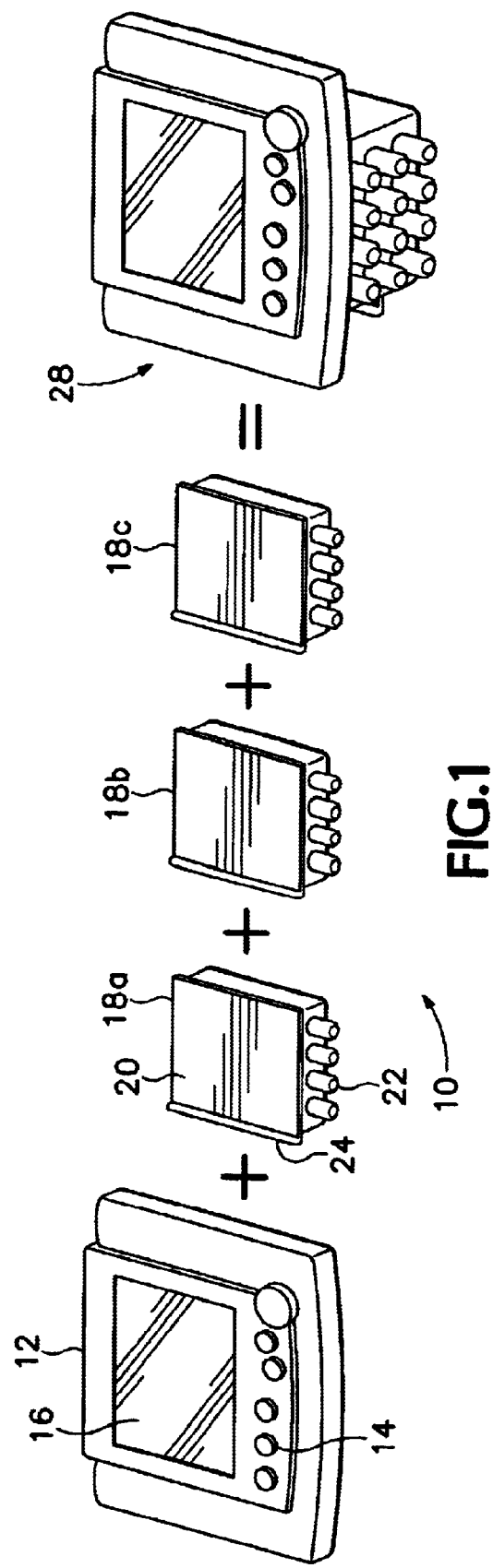

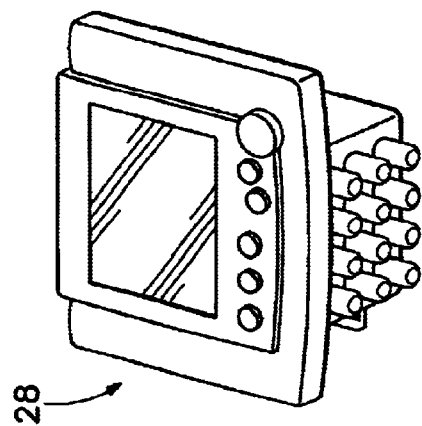
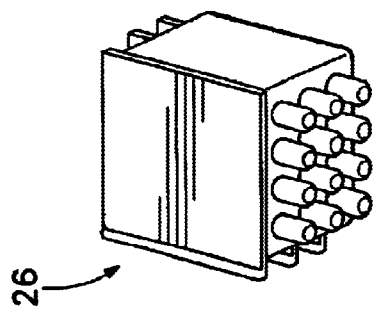
FIG.2
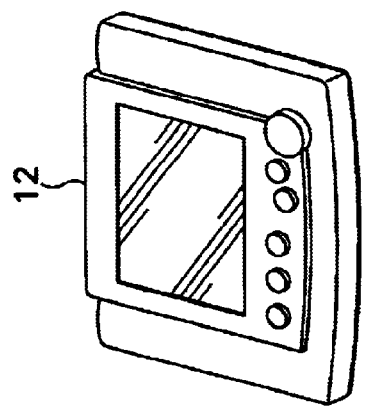

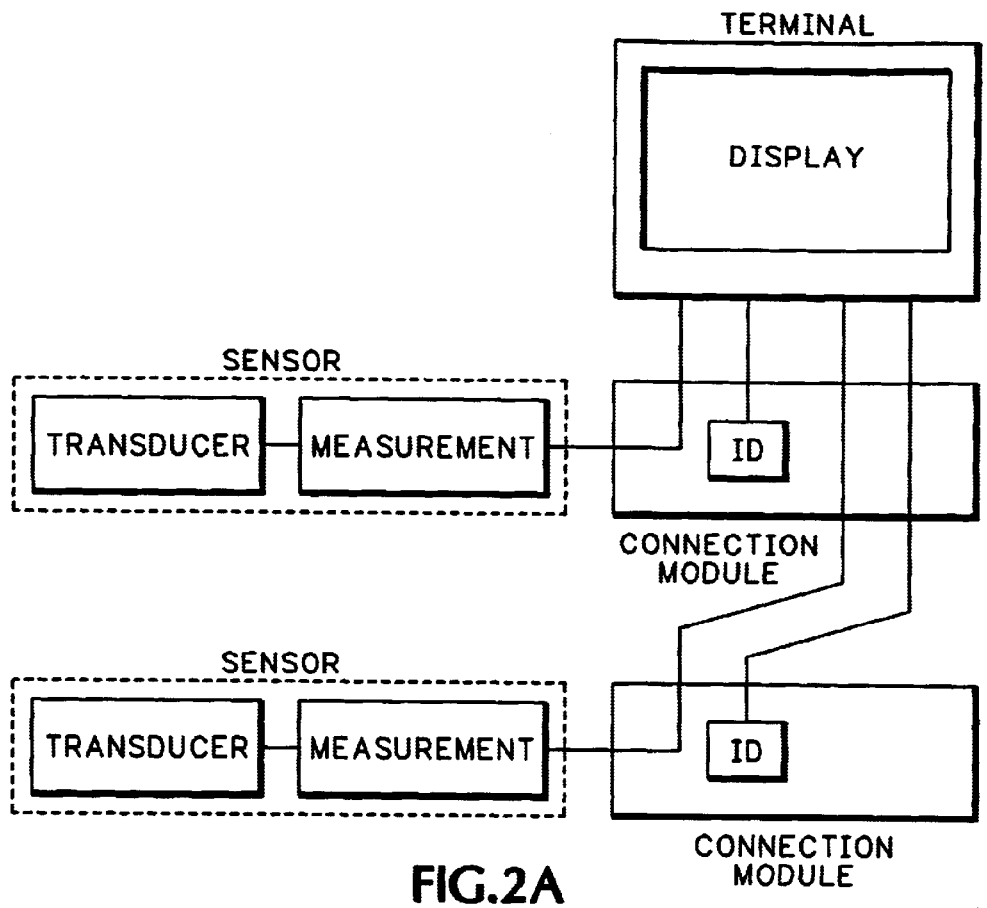
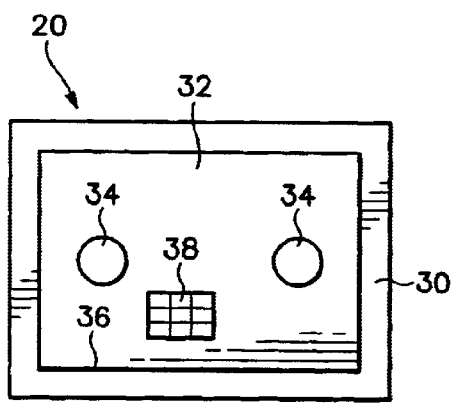
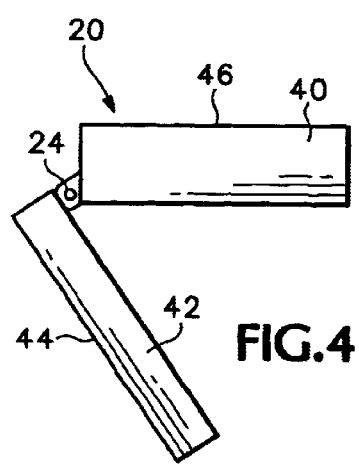

MODULAR MEASURING SYSTEM

The invention relates to a modular measuring system that is used in particular to measure various parameters in analysis, in particular in the analysis of water or wastewater. In the prior art, many different sensor types are installed in sewage treatment plants in various processing stages and in the discharge stages to provide information on individual water and wastewater parameters and thereby to ensure that sewage treatment plants are operated efficiently. These sensors have their own measurement circuits, referred to herein as measuring or measurand transducers, and an input/output unit, referred to herein as a "terminal," which allows operating parameters to be input for the sensor's measuring program and which allows results to be accessed or displayed. In modern systems the various sensors are connected to one another by means of a bus system. The object of the present invention is to provide a measuring system that permits measurement results to be represented in an error-free and informative manner and that avoids high costs for hardware.

The present invention achieves this object by means of a measuring system that possesses the elements of claim 1. Preferred embodiments of the invention are set forth in the dependent claims.

The measuring system comprises at least one measuring location, which may, for example, be embodied by a sensor, such as a pH electrode. Preferably, though, a multitude of measuring locations for analyzing various parameters are provided. At least one connection module, which is used to connect a plurality of sensors, is provided at least one measuring location. Each measuring location has its own identification code, which preferably is provided in the connection module for the measuring location, for example as data in a storage module. An input/output terminal can be connected to the connection module. This terminal receives information via the identification code that is used in conjunction with the data stored in the terminal to determine at which measuring location it is located and which input/output functions are to be activated as the primary functions for which sensors. In theory, the identification code can also be provided in a sensor or in a sensor circuit. However, to achieve good accessibility, the element is preferably located in the connection module.

The invention is described below as it relates to monitoring the activities of a sewage treatment plant. However, it can be used equally well for other measurement applications.

As a rule, the measurand transducer and a sensor's electronic circuits are located in the sensor housing. Each sensor and its appurtenant circuitry are then connected to a connection module, which possesses an identification code and a connection for the sensor. The connection module preferably has its own housing, which possesses a port for connecting a terminal used to input/output data. This port is preferably configured as a bus. The identification code present in the connection module is preferably present as data in a storage element. However, the identification code may also be provided as a switching matrix between specific bus lines or in a radio-frequency or infrared communications system. When the terminal is connected, it receives the identification code from the connection module, which allows specific input/output functions to be activated for specific devices in the terminal. This is advantageous in that a single terminal can be connected to various connection modules located at various measuring locations in a sewage treatment plant, for example at the inlet, in clarifiers, and at the discharge. The identification code tells the terminal where the terminal is currently located and which input/output functions are to be activated for specific sensors. This effectively prevents improper operation and makes it much easier to operate the sensors.

A plurality of connection modules can preferably be interconnected by means of a bus system. This allows the number of sensors at a measuring location to be increased on an ongoing basis.

The connection modules can preferably be connected by means of mechanically connectable adapter surfaces located in their housing and complementary mating surfaces. The mechanical connection is preferably combined with an electrical contact if electrical contacts are provided in the area of the connection surfaces to establish electrical connections between the components. The terminal also has a connection surface of this type on its rear side. It can therefore be held in an interlocking but releasable manner on a connection module or a connection module pack in a position in which electrical contact is made. In this way, a terminal can be taken to the connection modules of various measuring locations and can be plugged in there while measurements are being taken or maintenance/input work is being carried out. Once the work is completed, the terminal can be removed. Moreover, if one uses a graphical display that is preferably provided in the terminal, the data from the sensors can be displayed in various formats or can be used in calculations. The exchange of data between the terminal and the sensors takes place on the bus system in an essentially known manner. Each connection module housing preferably has an adapter surface as well as a mating surface, which permits a plurality of connection modules to be connected easily and thus allows a measuring location to be upgraded as needed by adding additional sensors. This connection can be achieved by using conventional latching-type elements, or it can be made more permanent—for example by using screws or bayonet connectors. This modular integration of the number of different connection modules achieves modularization and allows various types of sensors to be combined at will in whatever ways make sense. The input and output to and from all of these composite sensors can be implemented at the measuring location through the use of a plug-in terminal. This terminal can be used to input the operating parameters to the measurand transducers of various sensors; and the data measured by all of the sensors can either be displayed individually or in meaningful combinations of data, which makes it possible to represent the data that has to be generated and calculated from various measuring locations in a much better way. The transfer of data between the connection modules and the terminal is preferably carried out by means of a bus system in which electrical contact is made in the area of the adapter surfaces and their mating surfaces. The data can be communicated between the various sensors and the terminal in standardized digital formats. Peripherals such as power supplies, data storage modules, and relays can preferably be located in their own housings, each equipped with corresponding adapter and mating surfaces, so that they can be connected to the modular system. This allows the amount and cost of hardware needed for the entire system to be reduced further since now a single power supply is all that is needed to supply power to a combined pack comprising a number of different connection modules (each having sensors connected to them).

In this way, a single terminal can be provided for a plurality of measuring locations, and the terminal does not need to be continuously exposed to the weather. When the terminal is being used, the identification code tells it which measuring locations it is present at within the sewage treatment plant.

Each housing preferably has its adapter and mating surfaces on its front and rear sides, so that the housings of a number of different connection modules can be connected to one another vertically. In this way, the terminal can be placed on the front side of the pack. Such a combination of a plurality of connection modules and a permanently screwed down or removable terminal can be installed in any desired position—for example on a wall, on a control panel, in the field, in—a shelter, or on a DIN rail. The connection modules can be combined in a freely configurable manner, since all of them have an identical adapter surface and mating surface as well as a standardized bus system utilizing a standard protocol. This also significantly simplifies the handling—i.e. storage and manufacturing—of the entire system since the connection module housings preferably have a standard size.

The connection module housing is preferably equipped with a hinge so that it can be opened easily. This allows the modules that are attached in front of the housing and behind the housing to pivot relative to one another. Such pivoting allows a module to be serviced, enhanced, or repaired, even if the connection module is surrounded by a relatively large number of interconnected housings. This makes the entire system extremely maintenance-friendly. The location of the hinge in the housing between the adapter surface and the mating surface allows modules or terminals located on the front side to be swung out of the way so that work on a module that needs to be serviced can proceed unhindered.

Of course, the adapter and mating surfaces can also be located on the side surfaces or the top and bottom sides of the housing. However, stacking a number of connection module housings on top of one another would seem to be advantageous since this results in a homogeneous overall configuration whose front side is formed solely by the adapter surface for the terminal or by the terminal itself.

The adapter surface and mating surface are preferably provided with complementary locating means that prevent the surfaces from moving relative to one another. The electrical contacts in the area of the surfaces are preferably embodied as spring-loaded contacts or as sliding or friction contacts that establish a reliable electrical connection automatically when two housings are connected mechanically.

The invention is described below using the simplified drawing as an example. The drawing shows:

FIG. 1 a perspective view of the components of a system having three different connection modules and one terminal, FIG. 2 a view similar to that of FIG. 1 showing integrated connection modules, FIG. 2A a schematic block diagram of the measuring system.

FIG. 3 a top view of the adapter surface of a connection module housing of FIGS. 1 and 2, FIG. 4 a side view of a swung-out connection module housing.

FIG. 1 shows a measuring system 10 comprising a terminal 12 having input elements 14 and a display 16, a first connection module 18a having a housing 20 containing an electrical storage element having an identification code for the terminal with connections 22 for sensors and a hinge 24 that allows the front side of the housing to be swung open. The system also comprises two additional connection modules 18b and 18c for additional sensors that are used, for example, to measure nitrate, oxygen, or pH. On their front and rear sides, the housings 20 of the connection modules 18a to 18c each have an adapter surface and a mating surface by which means the three connection modules 18a to 18c can be connected to one another in the form of a stack or pack 26 (FIG. 2). On its rear wall, terminal 12 also has an adapter surface or mating surface that can be used to connect the terminal 12 to the front side of the connection module stack 26. The terminal can either be screwed on in a secure manner or it can be installed by means of a removable latching-type connection, so that it can be removed after use. By plugging the individual connection modules 18a to 18c together to form a connection module stack 26 and by combining the stack 26 with the terminal 12, one obtains a modular overall system 28, which, in the present case, has three different connection modules and a terminal for importing and outputting the data from and to the various sensors. FIG. 2A shows the measuring system comprising two sensors, two connection modules and a terminal.

FIG. 3 provides a more detailed representation of the simplified representation of just the front side of a housing 20. The front side comprises a frame 30 and a surface 32 that is recessed relative to the frame 30 and that corresponds to the rear side of a housing 20. Two holes 34 are provided on the right and left sides in the middle of the recessed surface 32. These holes allow a plurality of housings 20 or a plurality of housings 20 and an assembly rear wall to be connected to each other by means of screws. The rear side of a housing 20 abuts the inside edge 36 of the frame 30 and, after screws of have been installed at positions 34, is securely held to the front wall of the housing. Spring-loaded electrical contacts 38 are provided on the recessed surface 32 to achieve reliable electrical connection for the bus system which runs through all the housings 20.

FIG. 4 shows a side view of a swung-open housing 20 having a rear piece 40 and a front piece 42, which are connected to each other by means of a hinge 24. The housing 20 is shown in the swung-open position. In this position, it is possible to access a connection circuit, which may be located in the interior of the housing 20, or a storage module containing an identification code for the terminal 12. The adapter surface shown in FIG. 3 is seen on the front side 44 of the housing, while the complementary mating surface is located on the rear side 46 of the housing. Even when the housings 20 are screwed together, each housing can be swung open to allow all measurement circuitry to be accessed, even in the case of a composite overall system 28 (FIGS. 1 and 2).

The number of modules that can be connected to one another depends solely on the mechanical stability of the housing, the installation, and accessibility. For example, ten modules can even be connected together, although combinations using a lesser number of measuring transducers—for example, five including peripherals, the power supply and the terminal—would seem to be advantageous.

The identification code allows the terminal to provide precisely those input/output functions needed by the sensor combination present at the given measuring location, even though completely different combinations of sensors are present at different measuring locations, of course, other sensors that are connected to the bus system can also be accessed.

What is claimed is:

1. A modular measuring system comprising:
   at least one sensor, the or each sensor including a transducer and a measurement circuit for providing a sensor signal that is representative of a measured value of a sensed variable,
   at least one connection module, the or each connection module including a means by which identification data is stored and having at least one terminal for connecting the connection module to a sensor to receive the sensor signal provided by the sensor, and an input/output unit that is engageable with the connection module and includes a display device and electronics for controlling operation of the display device, the connection module and the input/output unit including an interconnection for transmitting the sensor signal to the input/output module and allowing the electronics of the input/output unit to read the identification data from the connection module, whereby the electronics of the input/output unit controls operation of the display device of the input/output unit on the basis of the identification data stored by the connection module.

2. The modular measuring system of claim 1, wherein the connection module has a housing provided with at least one adapter surface and the input/output unit is provided with at least one mating surface that is complementary to the adapter surface.

3. The measuring system of claim 2, including complementary electrical contacts in the area of each contact surface and each mating surface.

4. The measuring system of claim 3, wherein the connection module has a bus connection that is routed to the electrical contacts of the housing.

5. The measuring system of claim 2, wherein the housing is provided with a mating surface as well as an adapter surface.

6. The measuring system of claims 5, wherein the housing includes a rear piece, a front piece, and a hinge connecting the rear piece and the front piece to permit relative pivotal movement of the rear piece and the front piece, and wherein the adapter surface and the mating surface are provided on the front piece and the rear piece respectively.

7. The measuring system of claim 5, wherein the adapter surface and the mating surface (44, 46) are located on the front and rear sides of the housing (20).

8. The measuring system of claim 2, comprising at least first and second connection modules having first and second housings respectively.

9. The measuring system of claim 8, wherein the adapter surface and the mating surface of the first and second housings have locating means that are complementary to one another.

10. The measuring system of claim 8, wherein the adapter surface and the mating surface of the first and second housings are removably engaged to one another.

11. The measuring system of claim 10, wherein the adapter surface and the mating surface of the first and second housings are removably engaged to one another by means of screws.

12. The measuring system of claim 1, comprising a peripheral having a housing provided with at least one of an adapter surface and a mating surface having electrical contacts.

13. The measuring system of claim 12, wherein the peripheral is a power supply or a memory unit.

14. The measuring system of claim 1, wherein the connection module includes a storage element by which the identification data is recorded.

15. A modular measuring system comprising:

at least first and second sensors each including a transducer and a measurement circuit for providing a sensor signal that is representative of a measured value of a sensed variable, at least first and second connection modules each including a means by which identification data is stored and each having at least one terminal for connecting the connection module to a sensor to receive the sensor signal provided by the sensor, and an input/output unit including a display device and electronics for controlling operation of the display device, and wherein the second connection module is engaged with the first connection module, the input/output unit is engaged with the second connection module, and the connection modules and the input/output unit include an interconnection for transmitting the sensor signals received by the first and second connection modules respectively to the input/output module and allowing the electronics of the input/output unit to read the identification data from the connection modules respectively, whereby the electronics of the input/output unit controls operation of the display device on the basis of the identification data.

* * * * *